Aug. 18, 1959     J. TUDGE     2,900,538
DYNAMO-ELECTRIC MACHINES

Filed June 6, 1956     3 Sheets-Sheet 2

INVENTOR
Joseph Tudge
ATTORNEYS

Aug. 18, 1959  J. TUDGE  2,900,538
DYNAMO-ELECTRIC MACHINES
Filed June 6, 1956  3 Sheets-Sheet 3

INVENTOR
Joseph Tudge
By
ATTORNEYS

United States Patent Office
2,900,538
Patented Aug. 18, 1959

2,900,538

DYNAMO-ELECTRIC MACHINES

Joseph Tudge, Walkden, Manchester, England, assignor to Metropolitan-Vickers Electrical Company Limited, London, England, a British company Application June 6, 1956, Serial No. 589,790

Claims priority, application Great Britain June 14, 1955

4 Claims. (Cl. 310—59)

This invention relates to the ventilation of dynamo-electric machines and is particularly concerned with the cooling of stators for large generators.

One of the limitations in the design of large generators is the temperature rise in the copper of the stator. It is, therefore, an object of the present invention to provide improved means for cooling the stator copper.

Accordingly the present invention provides a dynamo-electric machine having rotor and stator members and in which the stator contains a plurality of axially extending conductors at least some of which are hollow to provide cooling ducts therealong, and fan or pump means adapted to circulate cooling fluid in the stator generally, and wherein there is provided additional fan or pump means communicating with the conductor cooling ducts for causing cooling fluid to flow therein.

The fluid that is passed through the conductor cooling ducts is preferably directly discharged to coolers situated in the stator frame. The fan or pump means for the conductor cooling ducts may be arranged to extract fluid circulating in the stator and cause it to flow in the conductor cooling ducts. The flow may be caused by arranging the fan or pump means to provide suction at one end of the conductors.

In carrying out the invention the cooling fluid employed may be a gas which may be circulated in the stator by one or more axial flow fans, which provide a high volume of gas at low pressure. The fan for the conductor cooling ducts may provide a high pressure differential with a low volume of gas flow. Both fans may be mounted on the rotor shaft.

In a preferred embodiment of the invention the high pressure differential is obtained by a centrifugal type fan having forward curved blades and running in a volute, the fan being mounted on the rotor shaft of the machine. The volute is arranged to discharge directly to coolers situated in the stator frame. An annular chamber may also be provided to enclose the noses of the conductor coils at one end of the stator, said chamber communicating with the cooling ducts in the conductors and with the fan or pump means therefor so that cooling fluid may be drawn by said means from the chamber, and a high pressure differential set up along the length of the conductor cooling ducts to cause cooling fluid to flow therein.

In addition the invention may provide improved electrical terminals for the stator to carry the heavier currents obtainable by practising the invention.

In order that the invention may be more fully understood reference will now be made to the accompanying drawings, in which:

Fig. 2 shows an end view of a section of the stator showing the centrifugal fan; while

Figure 1:
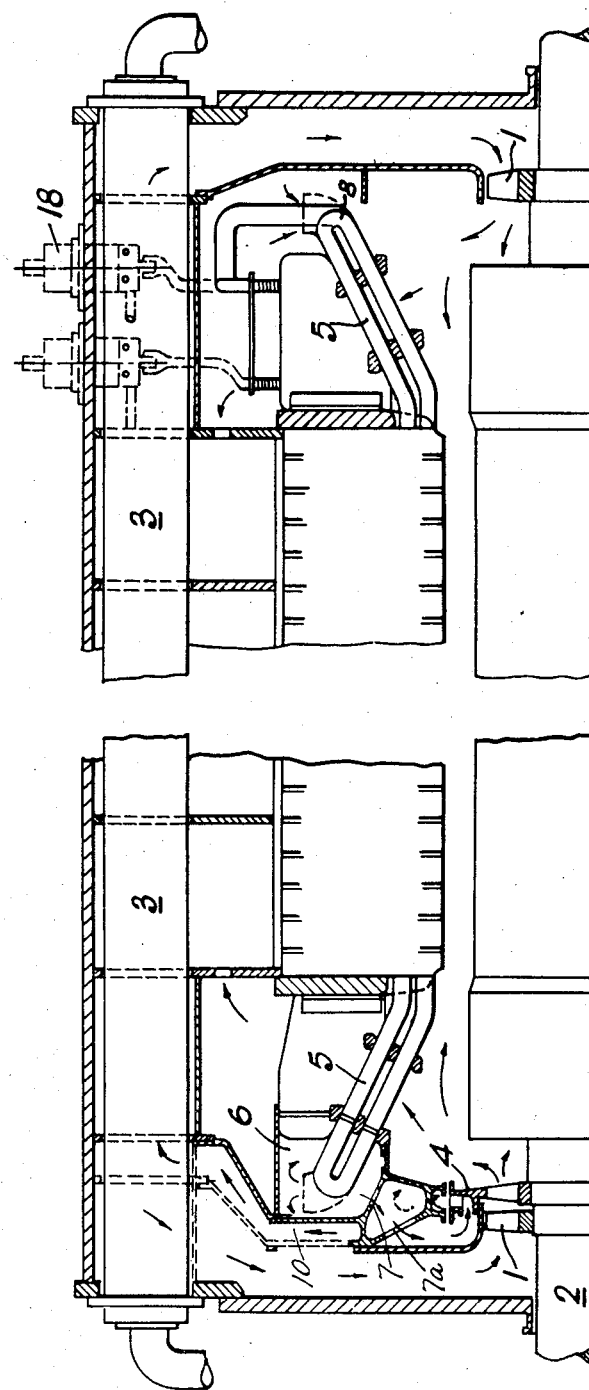
Fig. 1 shows a sectional view of a stator.

Referring to Fig. 1, there is shown two axial flow fans 1 each situated at opposite ends of the rotor shaft 2. These fans are arranged to extract cooling gas from cooler 3 and to cause the gas to circulate in the stator generally as shown by the arrows. In addition there is mounted at the non-connected end of the machine an additional fan 4. This fan is of the centrifugal type with forward curved blades and a volute and is arranged to draw gas through ducts (not shown) in the stator conductors 5 from one end of the machine to the other. To facilitate this action an annular chamber 6 is constructed partly of insulating material to enclose the noses of the conductor coils 5 and connection is made between this chamber and the inlet of the centrifugal fan 4 by holes 7 and 7a which exist only in the "dead" portion outside the volute.

It is well known that forward curved bladed fans running in a volute have high pressure coefficents and one such single stage fan is sufficient to produce the necessary vacuum in chamber 6 required to draw gas at a high velocity through the long path formed by small ducts within the stator coils from inlets 8 at the other end thereof. It will be noticed that the centrifugal fan 4 is mounted on rotor shaft 2 immediately behind axial flow fan 1 and hence must be carried by spokes preferably inclined to reduce mechanical stresses.

Figure 2:
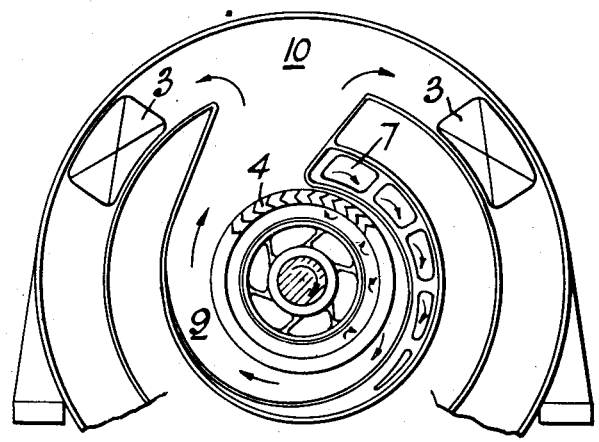

Referring to Fig. 2 the detailed arrangement of centrifugal fan 4 is shown in greater detail. It can be seen that fan 4 draws gas in from inlet holes 7 and 7a in the dead portion of the volute 9 and then discharges the gas into the volute 9 which communicates with a hot gas chamber 10 and the gas flow thence to coolers 3.

The ventilation of the machine is thus made up of a low pressure high volume system, feeding the body of the machine in the conventional manner, which may include the usual auxiliary central inlet arrangement, and a superimposed high suction low volume system, effected by a centrifugal fan at the non-connected end of the machine and augmented by the low pressure fan at the connected end, which in combination feed the stator coils. From the foregoing description it will be apparent that a high pressure differential across opposite ends of the stator conductors is achieved without interfering with the general ventilation of the machine and without increasing appreciably the axial length to accommodate the extra fan, which is important from rotor critical speed considerations.

Figure 3:
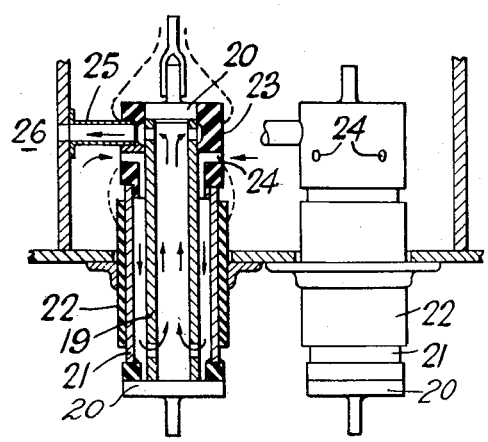
Fig. 3 shows an improved terminal in elevation and sectional elevation.

The up-rating of the stator winding offered by the present invention is enhanced by an improved terminal design. Fig. 3 shows two gas cooled terminals, one of which is in section. The terminals are also indicated in Fig. 1 by the reference 18. The current carrying element 19 is made of hollow copper tube of relatively small diameter, a construction which automatically lends itself to uniform current distribution and low power loss. Solid end-caps 20 are brazed to the ends of the tube; the lower one being the larger in diameter for the purpose of bolting and sealing to a non-magnetic metal enclosing tube 21, which carries the bushing insulation 22. The annular space between the tubes is maintained concentric at the top with an insulation header 23 possessing inlet gas ports 24 and outlet gas chamber and insulating discharge tube 25, of suitable proportions to prevent electrical surface creepage. Radial ports at the top and bottom of the conducting tube 19 enable gas, under the influence of pressure between the terminal chamber and adjacent outlet compartment 26, to flow over its inner and outer surface.

Figure 4:
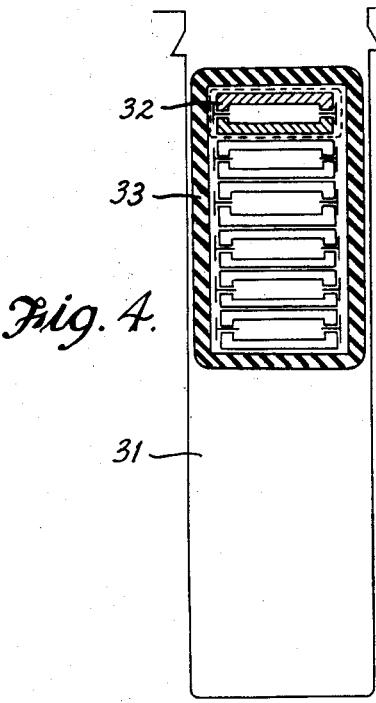
Figs. 4–9 show a preferred construction of the hollow conductor winding.

Referring to Figs. 4–9 inclusive which show a preferred construction of the hollow conductor winding, the general arrangement is as shown in Fig. 4. Fig. 4 shows a stator slot 31, in section, containing a winding formed of a plurality of hollow stacked conductors 32. The winding is surrounded by insulation 33.

Figure 5:
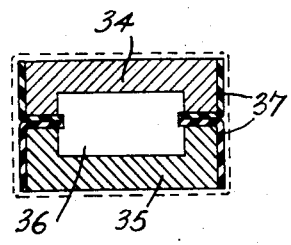

Fig. 5 shows a hollow conductor in more detail and it can be seen that each conductor is formed of two strands 34 and 35 each of channel section, placed together so as to define a duct 36 therebetween. Strands 34 and 35 are insulated from each other by means of insulating angle or T pieces 37.

Figures 8, 9:
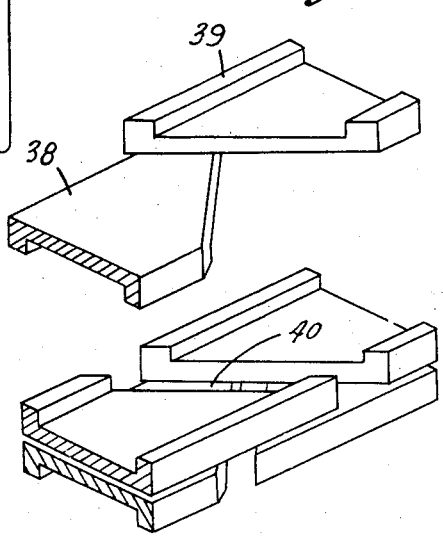
Figures 6, 7:
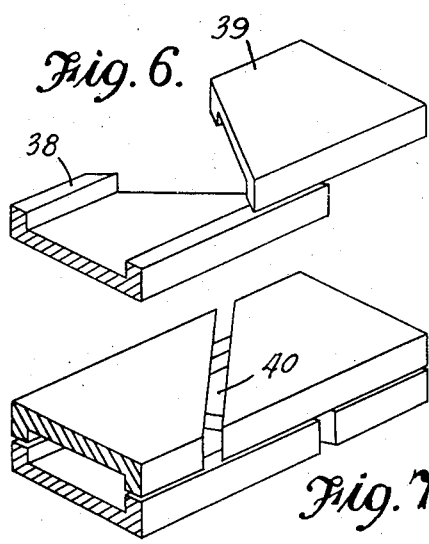

Transportation of the strands in a slot to prevent edge-currents can be effected by cutting the strands at a suitable angle and brazing together as shown in Fig. 6 and Fig. 8 in each of these figures strands 38 are electrically connected to strands 39. The complete cross-over will be built up as shown in Fig. 7 and Fig. 9 respectively, and insulation pieces, not shown, cut from channel section, can be inserted in spaces 40 at the cross-overs to separate the conductor strands without restricting the cooling gas passages.

Where permissible, each pair of conductor strands forming a gas passage may be transposed once in the middle of the machine as shown in Fig. 7 and transposition of the pairs effected at the coil noses at one end of the machine may be carried out in the usual well-known manner.

The proportion of insulation between the strands with this construction is extremely small, thus providing larger copper and gas space. Furthermore the construction is very rigid and the gas is in direct contact with the copper giving a low resistance gas path and good heat transfer.

What I claim is:

1. A dynamo-electric machine having a rotor member and a stator member, said stator member containing a plurality of axially extending conductors at least some of which are hollow to provide cooling ducts therealong, an axial flow fan situated at each end of said rotor for forcing cooling fluid from the ends of the machine towards the centre thereof to effect cooling in the stator generally, a centrifugal fan of annular form mounted adjacent to and surrounding one of the axial flow fans, said centrifugal fan comprising a rotor portion and a stator portion, said rotor portion comprising forward curved blades and said stator portion comprising walls defining a volute in which said blades are adapted to rotate, means for fixing said rotor portion to the rotor member of the machine, an annular chamber surrounding the stator portion of said centrifugal fan and enclosing the noses of the conductor coils, means for connecting said annular chamber with said conductor cooling ducts, and means defining openings in the dead portion of said stator portion volute communicating with said annular chamber whereby said centrifugal fan may suck cooling fluid from said annular chamber through said conductor cooling ducts, and a cooler, and means for directly feeding the cooling fluid discharged from said centrifugal fan to said cooler.

2. A dynamo-electric machine having a rotor member and a stator core, a casing surrounding said stator core and defining a cooling space, a cooler, a plurality of axially extending hollow conductors within said stator core providing cooling ducts through said core and communicating at one end with said cooling space, a first low pressure cooling system comprising a relatively low pressure differential fan for circulating cooling fluid through said cooling space, through and around said stator core, and through said cooler, and a second high pressure cooling system, which is in parallel with a portion of said low pressure system, comprising a relatively high pressure differential fan, the input of which connects directly with the cooling ducts at the ends thereof remote from said cooling space, for extracting a portion of the low pressure cooling fluid from said cooling space, passing it at high velocity through said cooling ducts, and exhausting it to said cooler.

3. A dynamo-electric machine having a rotor member and a stator core, a casing surrounding said stator core and defining a cooling space, a cooler, a plurality of axially extending hollow conductors within said stator core providing cooling ducts through said core and communicating at one end with said cooling space, a first low pressure cooling system comprising a relatively low pressure differential fan for circulating cooling fluid through said cooling space, through and around said stator core and through said cooler, and a second high pressure cooling system, which is in parallel with a portion of said low pressure system, comprising a relatively high pressure differential fan, the input of which connects directly with the cooling ducts at the ends thereof remote from said cooling space, for extracting a portion of the low pressure cooling fluid from said cooling space, passing it at high velocity through said cooling ducts, and exhausting it to said cooler, said relatively high pressure differential fan comprising a centrifugal type rotor portion having forward curved blades and a stator portion defining a volute, said rotor portion being adapted to rotate in said stator portion and being fixed to the rotor member of the machine.

4. A dynamo-electric machine having a rotor member and a stator core, a casing surrounding said stator core and defining a cooling space, a cooler, a plurality of axially extending hollow conductors within said stator core providing cooling ducts through said core and communicating at one end with said cooling space, a first low pressure cooling system comprising a relatively low pressure axial flow fan situated at one end of the rotor member for circulating cooling fluid through said cooling space, through and around said stator core, and through said cooler, and a second high pressure cooling system, which is in parallel with a portion of said low pressure system, comprising a relatively high pressure differential centrifugal fan of annular form mounted adjacent to and surrounding said axial flow fan and means for supporting said centrifugal fan on said rotor member, the input to which connects directly with the cooling ducts at the ends thereof remote from said cooling space, for extracting a portion of the low pressure cooling fluid from said cooling space, passing it at high velocity through said cooling ducts, and exhausting it to said cooler.

References Cited in the file of this patent

UNITED STATES PATENTS

| 1,170,192 | Rudenberg | Feb. 1, 1916 |
| 2,130,888 | Marshall | Sept. 20, 1938 |
| 2,707,244 | Kilgore | Apr. 26, 1955 |
| 2,722,616 | Moses | Nov. 1, 1955 |
| 2,727,161 | Kilner | Dec. 13, 1955 |
| 2,742,583 | Beckwith | Apr. 17, 1956 |
| 2,752,515 | Baudry | June 26, 1956 |

FOREIGN PATENTS

| 443,017 | Great Britain | Feb. 18, 1936 |
| 1,099,213 | France | Mar. 16, 1955 |